(12) United States Patent
Tanaka et al.

(10) Patent No.: US 8,451,749 B2
(45) Date of Patent: May 28, 2013

(54) WIRELESS COMMUNICATION DEVICE AND WIRELESS COMMUNICATION CONTROL METHOD

(75) Inventors: Osamu Tanaka, Osaka (JP); Nobuhiko Arashin, Osaka (JP)

(73) Assignee: Panasonic Corporation, Osaka (JP)

( * ) Notice: Subject to any disclaimer, the term of this patent is extended or adjusted under 35 U.S.C. 154(b) by 310 days.

(21) Appl. No.: 13/056,050

(22) PCT Filed: Jul. 22, 2009

(86) PCT No.: PCT/JP2009/003439
§ 371 (c)(1),
(2), (4) Date: Jan. 26, 2011

(87) PCT Pub. No.: WO2010/013410
PCT Pub. Date: Feb. 4, 2010

(65) Prior Publication Data
US 2011/0149795 A1    Jun. 23, 2011

(30) Foreign Application Priority Data

Jul. 29, 2008  (JP) ................................ 2008-195388

(51) Int. Cl.
*H04B 7/00* (2006.01)
*H04W 24/00* (2009.01)
*H04W 40/02* (2009.01)

(52) U.S. Cl.
USPC ............ 370/253; 370/310; 370/329; 370/349

(58) Field of Classification Search
USPC ................. 370/229, 230, 253, 310, 324, 329, 370/336, 337, 349, 395.4, 536, 537
See application file for complete search history.

(56) References Cited

U.S. PATENT DOCUMENTS

| | | | |
|---|---|---|---|
| 6,934,297 B1 * | 8/2005 | Bensaou et al. | 370/445 |
| 2003/0142658 A1 * | 7/2003 | Ofuji et al. | 370/349 |
| 2005/0152313 A1 | 7/2005 | Cave et al. | |
| 2005/0152373 A1 | 7/2005 | Ali | |
| 2005/0271019 A1 | 12/2005 | Yuan et al. | |
| 2006/0087995 A1 * | 4/2006 | Nago | 370/310 |
| 2006/0120302 A1 * | 6/2006 | Poncini et al. | 370/254 |
| 2007/0217339 A1 | 9/2007 | Zhao | |
| 2008/0095124 A1 | 4/2008 | Ramos et al. | |
| 2009/0003299 A1 | 1/2009 | Cave et al. | |
| 2010/0067473 A1 | 3/2010 | Cave et al. | |

FOREIGN PATENT DOCUMENTS

| | | |
|---|---|---|
| JP | 2003-229894 | 8/2003 |
| JP | 2006-067090 | 3/2006 |
| JP | 2006-128949 | 5/2006 |
| JP | 2006-246030 | 9/2006 |
| JP | 2007-74210 | 3/2007 |

(Continued)

*Primary Examiner* — Afsar M Qureshi
(74) *Attorney, Agent, or Firm* — Wenderoth, Lind & Ponack, L.L.P.

(57) ABSTRACT

In the case where one set of EDCA access parameters is set, there are problems such as failure in performing QoS when a transmission rate is changed and a deterioration in transmission efficiency. A relay device is a wireless communication device which transmits received data according to a priority level of the data, including: a transmitting unit which transmits received data; a rate measuring unit which measures a rate at which the transmitting unit transmits the data; and a transmission control unit which adaptively controls a transmission waiting time for which the transmitting unit waits until start of the transmission of the data, according to the transmission rate of the transmitting unit which is measured by the rate measuring unit, wherein the transmitting unit transmits the data according to transmission control by the transmission control unit.

10 Claims, 9 Drawing Sheets

FOREIGN PATENT DOCUMENTS

| | | |
|---|---|---|
| JP | 2008-502173 | 1/2008 |
| WO | 2005/069873 | 8/2005 |
| WO | 2005/069876 | 8/2005 |
| WO | 2005/119986 | 12/2005 |

\* cited by examiner

FIG. 2

| Priority level | AIFS | CWmin | CWmax |
|---|---|---|---|
| AC_VO | 1 | 0 | 1 |
| AC_VI | 3 | 0 | 3 |
| AC_BE | 7 | 0 | 7 |
| AC_BK | 15 | 0 | 1023 |

| Priority level | AIFS | CWmin | CWmax |
|---|---|---|---|
| AC_VO | 2 | 0 | 3 |
| AC_VI | 6 | 0 | 7 |
| AC_BE | 14 | 0 | 15 |
| AC_BK | 30 | 0 | 1023 |

(b)

| Priority level | AIFS | CWmin | CWmax |
|---|---|---|---|
| AC_VO | 4 | 0 | 7 |
| AC_VI | 12 | 0 | 15 |
| AC_BE | 28 | 0 | 31 |
| AC_BK | 60 | 0 | 1023 |

| Priority level | AIFS | CWmin | CWmax |
|---|---|---|---|
| AC_VO | 1 | 0 | 1 |
| AC_VI | 5 | 0 | 3 |
| AC_BE | 13 | 0 | 7 |
| AC_BK | 29 | 0 | 1023 |

(b)

| Priority level | AIFS | CWmin | CWmax |
|---|---|---|---|
| AC_VO | 3 | 0 | 1 |
| AC_VI | 9 | 0 | 3 |
| AC_BE | 21 | 0 | 7 |
| AC_BK | 29 | 0 | 1023 |

| Priority level | AIFS | CWmin | CWmax |
|---|---|---|---|
| AC_VO | 2 | 0 | 3 |
| AC_VI | 10 | 0 | 7 |
| AC_BE | 26 | 0 | 15 |
| AC_BK | 58 | 0 | 1023 |

(b)

| Priority level | AIFS | CWmin | CWmax |
|---|---|---|---|
| AC_VO | 6 | 0 | 3 |
| AC_VI | 18 | 0 | 7 |
| AC_BE | 42 | 0 | 15 |
| AC_BK | 58 | 0 | 1023 |

| Priority level | AIFS | CWmin | CWmax |
|---|---|---|---|
| AC_VO | 4 | 0 | 7 |
| AC_VI | 20 | 0 | 15 |
| AC_BE | 52 | 0 | 31 |
| AC_BK | 116 | 0 | 1023 |

(b)

| Priority level | AIFS | CWmin | CWmax |
|---|---|---|---|
| AC_VO | 12 | 0 | 7 |
| AC_VI | 36 | 0 | 15 |
| AC_BE | 84 | 0 | 31 |
| AC_BK | 116 | 0 | 1023 |

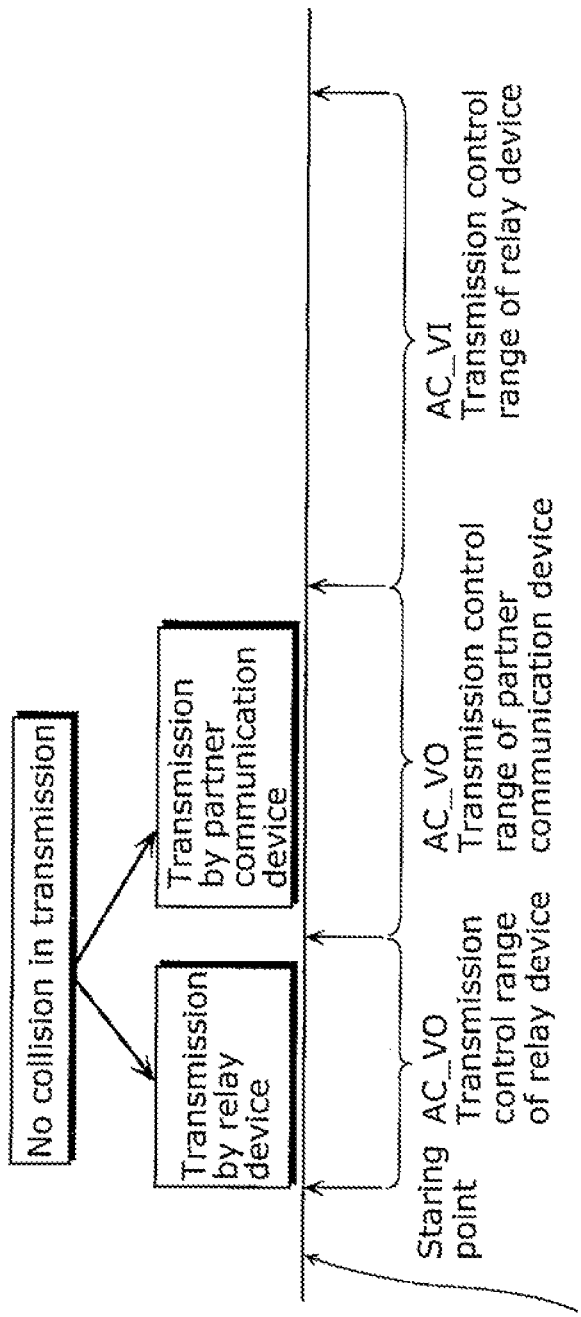

WIRELESS COMMUNICATION DEVICE AND WIRELESS COMMUNICATION CONTROL METHOD

TECHNICAL FIELD

The present invention relates to wireless communication devices and wireless communication control methods, and particularly to a wireless communication device and a wireless communication control method which achieve data priority control in a structure which performs data communication to which priority-based QoS (Quality of Service) is applied.

BACKGROUND ART

Along with the spread of data communication via networks such as the Internet and a LAN, home networking which achieves inter-device communication by network-connecting home appliances, computers, and other peripheral apparatuses in homes has been widely used. The home networking enables, for instance, content transmission and reception between network-connected apparatuses, and provides users with convenience and comfort. It is expected that the home networking will increasingly become widespread in the future.

For example, content reproduction processing is made possible by so-called streaming data distribution in which an apparatus having a receiving unit such as a tuner placed in a home and a storing unit such as a hard disk is set as a server, contents such as a movie held in the server are transmitted to a client apparatus such as a PC of a user via a network, and the client apparatus reproduces the contents while performing data reception. However, there is a case where communication data items compete with each other on the network. Such competition among the communication data items causes lack of communication bands, and a problem such as delay in streaming data distribution occurs.

In response to this problem, a mechanism of priority-based QoS which performs, according to priority levels assigned to packets, communication control on a wired LAN such as Ethernet (trademark) is defined by IEEE 802.1D which is one of normal standards regarding wired networks.

Furthermore, IEEE 802.11e, one of the standards regarding the wireless networks, is a version of IEEE 802.11 which is a set of standards for a wireless LAN communication system standardized by the American standard-setting organization IEEE (Institute of Electrical and Electronics Engineers). The function of IEEE 802.11e realizes QoS function in IEEE 802.11 communication system. The QoS function is realized by two main access methods. One of the methods is called EDCA (Enhanced Distributed Coordination Access), and is a method for classifying packets into four access categories and preferentially transmitting packets having a high priority level. The other method is a kind of HCF (Hybrid Coordination Function) which is called HCCA (HCF Controlled Channel Access), and is a method for achieving centralized control by performing HC (Hybrid Coordinator) using polling.

The EDCA is an access method for which DCF (Distributed Coordination Function) used in conventional IEEE 802.11 is expanded. The EDCA classifies packets into four access categories (ACs) including AC_BE for best effort, AC_BK for background traffic, AC_VI for video transmission, and AC_VO for audio, and performs transmission according to a priority level of each access category. The transmission procedure is performed by a method described below. When a packet to be transmitted is stored in a queue of each access category, the transmission is first waited for a waiting time called AIFS (Arbitration Inter Frame Space), and a random backoff procedure is then started. In the random backoff, an integer number in a range from 0 to a size of a contention window (CW) is randomly selected, and the transmission is waited for a time obtained by multiplying a slot time determined by a constant value by the selected integer number. Packet collision occurs when transmission is simultaneously started by wireless terminals which communicate with base stations after the wireless terminals wait for the same time, and the reason why the waiting time is randomized is that the packet collision is to be avoided. Communication of an other wireless terminal is not received via a channel in use, for a random backoff time. Moreover, the random backoff time is consumed for each slot time unless an other access category starts transmission. An access category of which backoff time reaches 0 first obtains a transmission right, and starts transmission after verifying that the other wireless terminal does not perform transmission through carrier sense. The carrier sense means detecting whether or not a frequency at which transmission is performed is available, by detecting a reception electric field strength of a carrier frequency and comparing the reception electric field strength with a threshold. It is to be noted that in the case where the other access category starts the transmission before the backoff time reaches 0, a backoff time remaining from the consumption of the backoff time of the access category is reserved as the next backoff time. In other words, a backoff time of each access category is consumed for each slot time after the lapse of AIFS until the access category obtains a transmission right, and reaches 0 at the end. This allows even access categories having a low priority level to eventually obtain a transmission right. Furthermore, in the case where a backoff time of each of two or more access categories concurrently reaches 0, access categories having a high priority level obtain the transmission right according to predetermined priority level. The access categories which have obtained the transmission right can perform transmission during TXOP (Transmission Opportunity). A CW value is doubled and the transmission procedure is performed again (i) in the case where packet collision causes transmission failure and (ii) for categories not transmitted due to competition among the access categories.

In this case, an initial CW value is determined by CWmin, and does not exceed the maximum value CWmax. CWmin and CWmax are calculated as below using exponential expressions of ECWmin and ECWmax, respectively.

$$CW\text{min} = 2^{ECW\text{min}} - 1$$

$$CW\text{max} = 2^{ECW\text{max}} - 1$$

AIFS, CWmin, and CWmax are determined for each of the four access categories. As stated above, the ECWmin value, the ECWmax value, and the transmission permitted time after obtainment of transmission right TXOP are independently set, and setting each value to a value according to a priority level of each access category allows relative priority control. These values are called EDCA access parameters. The values are communicated with beacon signals from a base station to a wireless terminal, and the wireless terminal performs transmission using the parameters.

Moreover, the base station may set access parameters used in transmission by the base station itself, independently of the wireless terminal.

Transmission prioritization using the EDCA allows packets having a high priority level to be preferentially transmitted. However, raising a priority level by shortening a size of a CW (Contention Window) of each of the packets having the high priority level causes danger of increasing a packet collision rate. To put it differently, a deterioration in randomness of random backoff, which is a collision avoidance algorithm, increases the packet collision rate in the case where the number of wireless terminals is increased. This in turn means that there is a problem of performance degradation in the case where traffic requiring a real-time property and having a high priority level such as VoIP or streaming data distribution of contents is transmitted by many wireless terminals.

In order to solve the above problem, the following has been proposed: monitoring a traffic volume in transmission of packets having a high priority level; and determining EDCA access parameters of a wireless terminal which communicates with a base station and EDCA access parameters used when the base station itself performs communication, in the case where the number of wireless terminals which transmit the packets having the high priority level at a traffic volume equal to or more than a constant value (refer to Patent Literature 1).

CITATION LIST

Patent Literature

[PTL 1]
Japanese Unexamined Patent Application Publication No. 2006-246030

SUMMARY OF INVENTION

Technical Problem

As stated above, it is possible to address the increase in the packet collision rate and enhance performance with respect to the problem of the performance degradation regarding the streaming data distribution of VoIP and contents in a home network.

However, in conventional techniques, a change in a transmission rate on a transmission line is not considered because of an assumption of communication via a communication line of which a transmission rate (physical rate or effective rate) is generally constant, and EDCA access parameters depend on only the number of wireless terminals of which an average transmission volume of packets having a high real-time property in a fixed section of the past is above a certain level. For this reason, in the case where the transmission rate of the transmission line is significantly changed by environmental influence of surroundings as in wireless communication, direct application of conventional EDCA access parameters makes it difficult to correctly control packet communication according to priority levels. For instance, in the case where an actual transmission rate is low even though EDCA access parameters are set according to a case where a transmission rate is high, previous data transmission has not been completed even when a data transmission start time comes. In such a case, transmission delay occurs because data transmission waited until the transmission start time cannot be performed. Moreover, in the case where the actual transmission rate is high even though the EDCA access parameters are set according to a case where the transmission rate is low, there is a period for which no data is transmitted at all, and transmission efficiency is deteriorated. It is to be noted that here, the physical rate refers to what bits of data can be transferred per unit time regardless of data contents, that is, a data transfer volume per unit time which is physically feasible. In contrast, transfer data including control data necessary for communication control is transmitted on a transmission line in addition to main data used in an application layer. The control data necessary for communication control refers to, for example, transfer backup data for preventing noise and the like on a transmission line from damaging transfer data, error correction data, a TCP header, and an IP header. The effective rate refers to a data transfer volume per unit time at which, among the above described transfer data, main data actually used in application is transferred.

The present invention has an object to provide a wireless communication device and a wireless communication control method which make it possible to maintain a real-time property of wireless communication in a home network and to perform smooth wireless communication, by solving the above conventional problem about a character unique to the wireless communication that the transmission rate is significantly changed by the environmental influence of the surroundings Solution to Problem In order to achieve the above object, a wireless communication device according to an aspect of the present invention is a wireless communication device which transmits received data according to a priority level of the data, including: a transmitting unit configured to transmit received data; a rate measuring unit configured to measure a rate at which the transmitting unit transmits the data; and a transmission control unit configured to adaptively control a transmission waiting time for which the transmitting unit waits until start of the transmission of the data, according to the transmission rate of the transmitting unit which is measured by the rate measuring unit, wherein the transmitting unit is configured to transmit the data according to transmission control by the transmission control unit.

Moreover, the wireless communication device according to the aspect of the present invention further includes a transmission control parameter holding unit which may hold transmission control parameter sets which correspond to transmission rates and include transmission parameters indicating that the transmitting unit waits for a shorter transmission waiting time for data to which a higher priority level is set, wherein the transmission control unit may select, from among the transmission control parameter sets, a transmission control parameter set including a specific parameter having a value indicating that a transmission waiting time is inversely proportional to the measured transmission rate.

Furthermore, in the wireless communication device according to the aspect of the present invention, the rate measuring unit may measure a physical rate which is bit traffic per unit time of the data transmitted by the transmitting unit.

Moreover, in the wireless communication device according to the aspect of the present invention, the data transmitted by the transmitting unit may include control data for transmission control and main data used by an application, and the rate measuring unit may measure an effective rate which is bit traffic per unit time of the main data in the data transmitted by the transmitting unit.

Furthermore, in the wireless communication device according to the aspect of the present invention, the transmission control unit may perform the transmission control using an EDCA (Enhanced Distributed Coordination Access) wireless access control system compliant with the IEEE 802.11e standard, and the specific parameter may be an AIFS (Arbitration Inter Frame Space).

Moreover, the wireless communication device according to the aspect of the present invention further includes a partner transmission control parameter holding unit which may hold, in the case where the wireless communication device performs bidirectional communication with a specific partner wireless communication device, partner communication control parameter sets with which the partner wireless communication device performs transmission control, according to a relative communication rate between the wireless communication device and the partner wireless communication device, wherein the rate measuring unit may measure the relative communication rate between the wireless communication device and the partner wireless communication device, the transmission control unit may select one of the transmission control parameter sets and one of the partner transmission control parameter sets according to the relative communication rate measured by the rate measuring unit, and the transmitting unit may transmit, to the partner wireless communication device, the partner transmission control parameter set selected by the transmission control unit from among the partner transmission control parameter sets.

Furthermore, in the wireless communication device according to the aspect of the present invention, the transmission control unit may perform the selection so that a transmission waiting time for which the transmitting unit of the wireless communication device waits is always different from a transmission waiting time for which a transmitting unit of the partner wireless communication device waits, with respect to concurrent transmission requests from the wireless communication device and the partner wireless communication device.

It is to be noted that the present invention is realized not only as the device but also as a method having, as steps, processing units included in the device, a program causing a computer to execute the steps, a computer-readable recording medium on which the program is recorded such as a CD-ROM, and as information, data, or a signal indicating the program. The program, information, data, or the signal may be distributed via a communication network such as the Internet.

Advantageous Effects of Invention

According to the present invention, a wireless communication device holds transmission control parameters corresponding transmission rates, measures a transmission rate (physical rate or effective rate), and performs, according to the measured transmission rate, relay processing by using a suitable transmission control parameter, thereby enabling preferential transmission of data having a high real-time property and reduction in disruption of streaming even when a communication state of a home network becomes worse and a transmission rate is frequently changed in a wireless section due to environmental influence.

BRIEF DESCRIPTION OF DRAWINGS

FIG. 2 is a diagram showing EDCA parameters which are held in a transmission control parameter holding unit according to Embodiment 1 of the present invention, are compliant with the EDCA wireless access control system of IEEE 802.11e standard, and set in the case where rate information is the maximum value.

FIGS. 3 (a) and (b) are diagrams showing examples of transmission control parameters used when rate information indicating a rate measured by a rate measuring unit of FIG. 1 is reduced by ½ or ¼. FIG. 3 (a) shows an example of transmission control parameters when the rate information is reduced by ½, and FIG. 3 (b) shows an example of transmission control parameters when the rate information is reduced by ¼.

FIG. 4 (a) is a diagram showing a relationship between (i) a data transmission time in the case where rate information from a rate measuring unit 12 is ½ of a set value of a predetermined transmission rate and (ii) the next transmission timing. FIG. 4 (b) is a diagram showing a relationship between (i) a data transmission time in the case where rate information from a rate measuring unit 12 is twice of a set value of a predetermined transmission rate and (ii) the next transmission timing.

FIGS. 7 (a) and (b) are diagrams showing examples of transmission control EDCA parameters each of which is used by a corresponding one of a relay device and a partner communication device in the case where rate information indicating a relative transmission rate between the relay device and the partner communication device is the maximum value. FIG. 7 (a) shows an example of transmission control parameters used by the relay device in the case where the rate information is the maximum value, and FIG. 7 (b) shows an example of transmission control parameters used by a partner communication device 60 in the case where the rate information is the maximum value.

FIGS. 8 (a) and (b) are diagrams showing examples of transmission control parameters each of which is used by a corresponding one of a relay device and a partner communication device in the case where rate information indicating a relative transmission rate between the relay device and the partner communication device is ½ of the maximum value. FIG. 8 (a) shows an example of transmission control parameters used by the relay device, and FIG. 8 (b) shows an example of transmission control parameters used by the partner communication device.

FIGS. 9 (a) and (b) are diagrams showing examples of transmission control parameters each of which is used by a corresponding one of a relay device and a partner communication device in the case where rate information indicating a relative transmission rate between the relay device and the partner communication device is ¼ of the maximum value. FIG. 9 (a) shows an example of transmission control parameters used by the relay device, and FIG. 9 (b) shows an example of transmission control parameters used by the partner communication device.

FIG. 10 is a diagram showing that setting of transmission control parameters causes a lag in a transmission waiting time between a relay device and a partner communication device, and makes it possible to prevent collision even in the case where the relay device and the partner communication device concurrently make transmission requests.

DESCRIPTION OF EMBODIMENTS

The following describes embodiments of the present invention with reference to the drawings.

Embodiment 1

Figure 1:
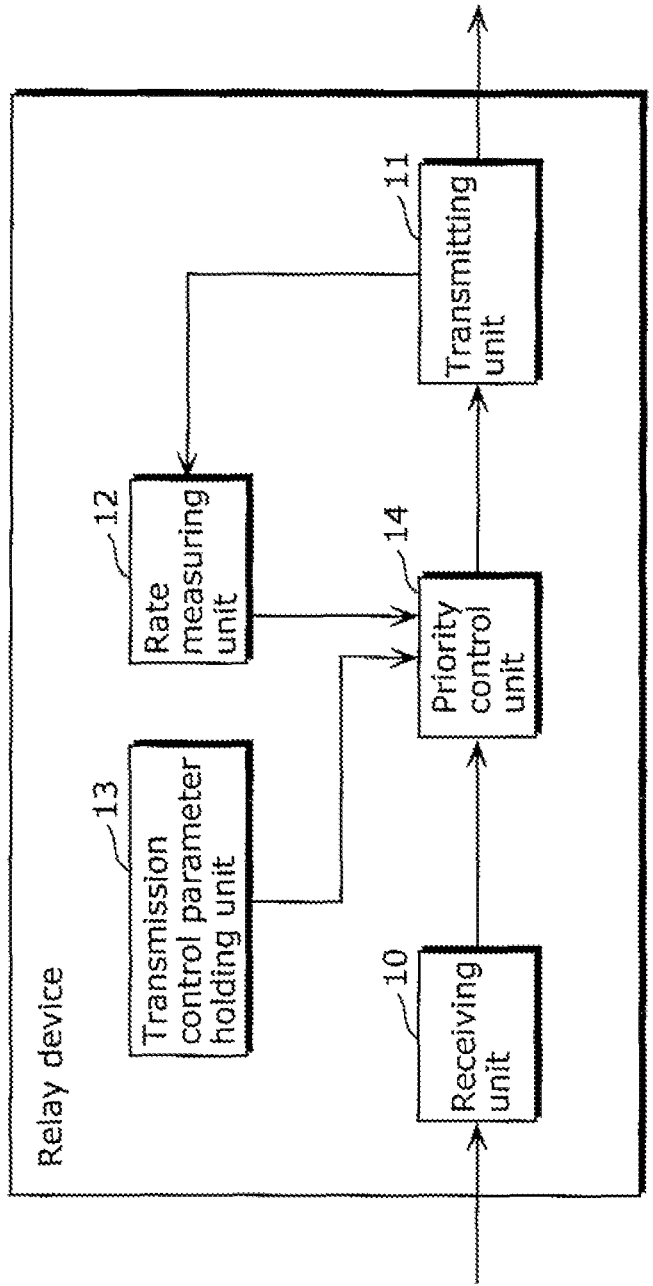
FIG. 1 is a block diagram showing a relay device according to Embodiment 1.

FIG. 1 is a block diagram showing a relay device according to Embodiment 1.

In the diagram, the relay device according to the present embodiment is an example of a wireless communication device which transmits received data according to a priority level of the data. The relay device is a relay device corresponding to a wireless access point which transmits data using, among transmission control parameters, transmission control parameters corresponding to a transmission rate of a transmitting unit 11, and includes: a receiving unit 10; the transmitting unit 11; a rate measuring unit 12; a transmission control parameter holding unit 13; and a priority control unit 14. The receiving unit 10 receives data. The transmitting unit 11 is an example of a transmitting unit which transmits received data, and transmits the data received by the receiving unit 10 or data generated therein. The rate measuring unit 12 is an example of a rate measuring unit which measures a rate at which the transmitting unit transmits the data. The rate measuring unit 12 measures a physical rate at which the transmitting unit 11 performs transmission, and generates rate information indicating the measured rate. The rate measuring unit 12 measures, for example, a physical rate of the transmitting unit 11 at the time of immediately previous data transmission. Alternatively, the rate measuring unit 12 may calculate an average transmission rate of the transmitting unit 11 at the time of transmitting data several times retroactively. The transmission control parameter holding unit 13 is an example of a transmission control parameter holding unit which holds transmission control parameter sets which correspond to transmission rates and include transmission parameters indicating that the transmitting unit waits for a shorter transmission waiting time for data to which a higher priority level is set, and holds plural types of transmission control parameters corresponding to rate information. Here, the priority control unit 14 is an example of a transmission control unit which adaptively controls a transmission waiting time for which the transmitting unit waits until start of the transmission of the data, according to the transmission rate of the transmitting unit which is measured by the rate measuring unit, and EDCA parameters are an example of a transmission control parameter set. Even in the case where the transmission rate of the transmitting unit 11 is changed, selective use of transmission control parameters by the priority control unit 14 according to the rate information allows the data to which the high priority level is set to be preferentially transmitted. The priority control unit 14 performs transmission control using the rate information of the transmitting unit 11 which is measured by the rate measuring unit 12 and the transmission control parameters corresponding to the rate information held in the transmission control parameter holding unit 13.

FIG. 2 is a diagram showing EDCA parameters which are held in a transmission control parameter holding unit according to Embodiment 1 of the present invention, are compliant with the EDCA wireless access control system of IEEE 802.11e standard, and are set in the case where rate information is the maximum value.

In Embodiment 1, the EDCA parameters shown in FIG. 2 are switched between according to rate information generated by the rate measuring unit 12. In FIG. 2, priority levels indicate four degrees of priority defined by IEEE 802.11e standard. The four degrees of priority are as follows: AC_VO having the highest priority level used for data having a limited tolerance for a delay of VoIP or jitter; AC_VI used for video data requiring a real-time property; AC_BE used for normal data; and AC_BK used for background data. AIFS, CWmax, and CWmin have been described above, and thus description thereof is omitted.

An advantageous effect produced when the priority control unit 14 changes initially-set EDCA parameters held in the transmission control parameter holding unit 13 according to rate information is described with reference to FIG. 3. FIG. 3 is a diagram showing specific examples of transmission control parameters obtained by changing AIFS and CWmax according to rate information. The relay device according to the present embodiment changes a transmission start waiting time of each AC inversely proportional to a rate. More specifically, when a rate of the transmitting unit 11 is reduced by ½ and ¼, the relay device doubles and quadruples transmission control parameters, respectively. In other words, the priority control unit 14 is an example of a transmission control unit which selects, from among the transmission control parameter sets, a transmission control parameter set including a specific parameter having a value indicating that a transmission waiting time is inversely proportional to the measured transmission rate, and an example of a transmission control unit which performs the transmission control using an EDCA (Enhanced Distributed Coordination Access) wireless access control system compliant with the IEEE 802.11e standard. Furthermore, along with change of AIFS, when rate information is reduced by ½ and ¼, CWmax is approximately doubled and quadrupled, respectively. FIG. 3 (*a*) is a diagram showing an example of EDCA parameters in the case where a transmission start waiting time AIFS of each AC is doubled when a transmission rate of the transmitting unit 11 is reduced by ½. FIG. 3 (*b*) is a diagram showing an example of EDCA parameters in the case where a transmission start waiting time AIFS of each AC is quadrupled when a transmission rate of the transmitting unit 11 is reduced by ¼.

Figure 4:
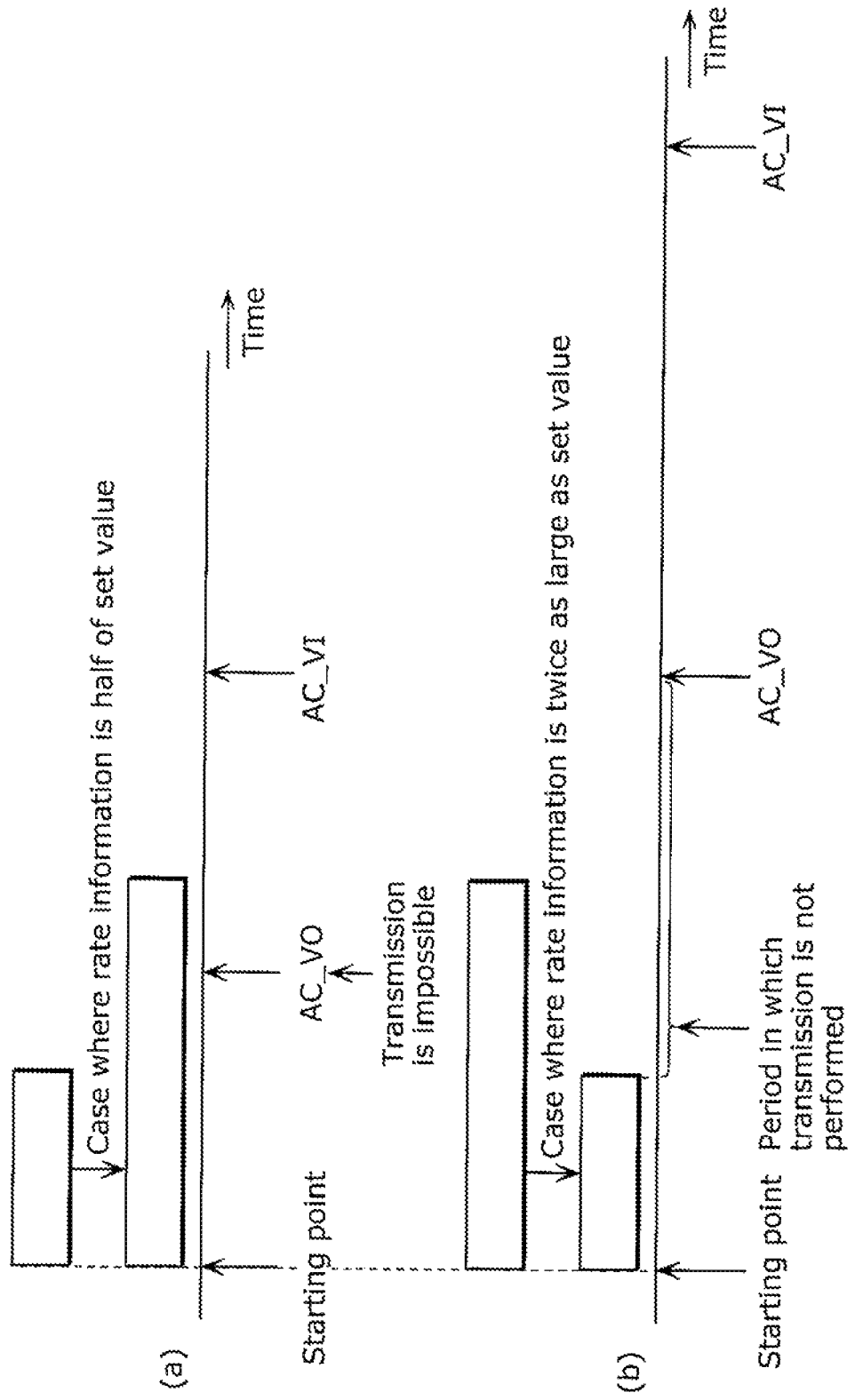
FIGS. 4 (a) and (b) are diagrams showing timings with which the relay device transmits AC_VO.

The transmission control parameters are controlled in the above manner for reasons below. FIG. 4 is a diagram showing timings with which the relay device transmits AC_VO. FIG. 4 (*a*) is a diagram showing a relationship between (i) a data transmission time in the case where rate information from the rate measuring unit 12 is ½ of a set value of a predetermined transmission rate and (ii) the next transmission timing. FIG. 4 (*b*) is a diagram showing a relationship between (i) a data transmission time in the case where rate information from the rate measuring unit 12 is twice of a set value of a predetermined transmission rate and (ii) the next transmission timing. In the both diagrams of FIGS. 4 (*a*) and (*b*), bar graph portions each indicates a transmission time necessary for transmitting AC_VO data having the same volume. Top bar graphs each indicates a transmission time of AC at a predetermined transmission rate, and bottom bar graphs each indicates a transmission time of AC at an actual transmission rate of the transmitting unit 11.

FIG. 4 is referred to for the following description. As shown in FIG. 4 (*a*), in the case where a rate indicated by rate information from the rate measuring unit 12 is ½ of a transmission rate (e.g., the maximum transmission rate) preset to the transmitting unit 11, it takes the transmitting unit 11 two times as long to transmit even the AC_VO data having the same data volume in comparison with a case where the transmission rate is a set value (the maximum value). Thus, although the transmission rate of the transmitting unit 11 is ½ of the maximum value, using the same transmission control parameters as in the case where the actual transmission rate of the transmitting unit 11 is the maximum value does not allow transmission of the next AC_VO even when a waiting time (backoff time) of AC_VO reaches 0, and there is generally a waiting time until transmission. In addition, AC_VI is transmitted when a waiting time (backoff time) of AC_VI having a low priority level reaches 0, and thus there is a problem that the priority is not maintained.

Moreover, as shown in FIG. 4 (*b*), in the case where the rate information is twice as large as the minimum value, setting transmission control parameters so that the rate information is the minimum value causes a data transmission time to end twice as early in comparison with the case where the transmission rate is the minimum value. For this reason, there is a period for which any AC is not transmitted until a transmission start time of the next AC_VO, and transmission efficiency is deteriorated.

It is to be noted that although Embodiment 1 has been described with reference to FIGS. 2 to 4, Embodiment 1 and FIGS. 2 to 4 are merely an exemplification, and the present invention is not limited to Embodiment 1 and FIGS. 2 to 4.

Figure 5:
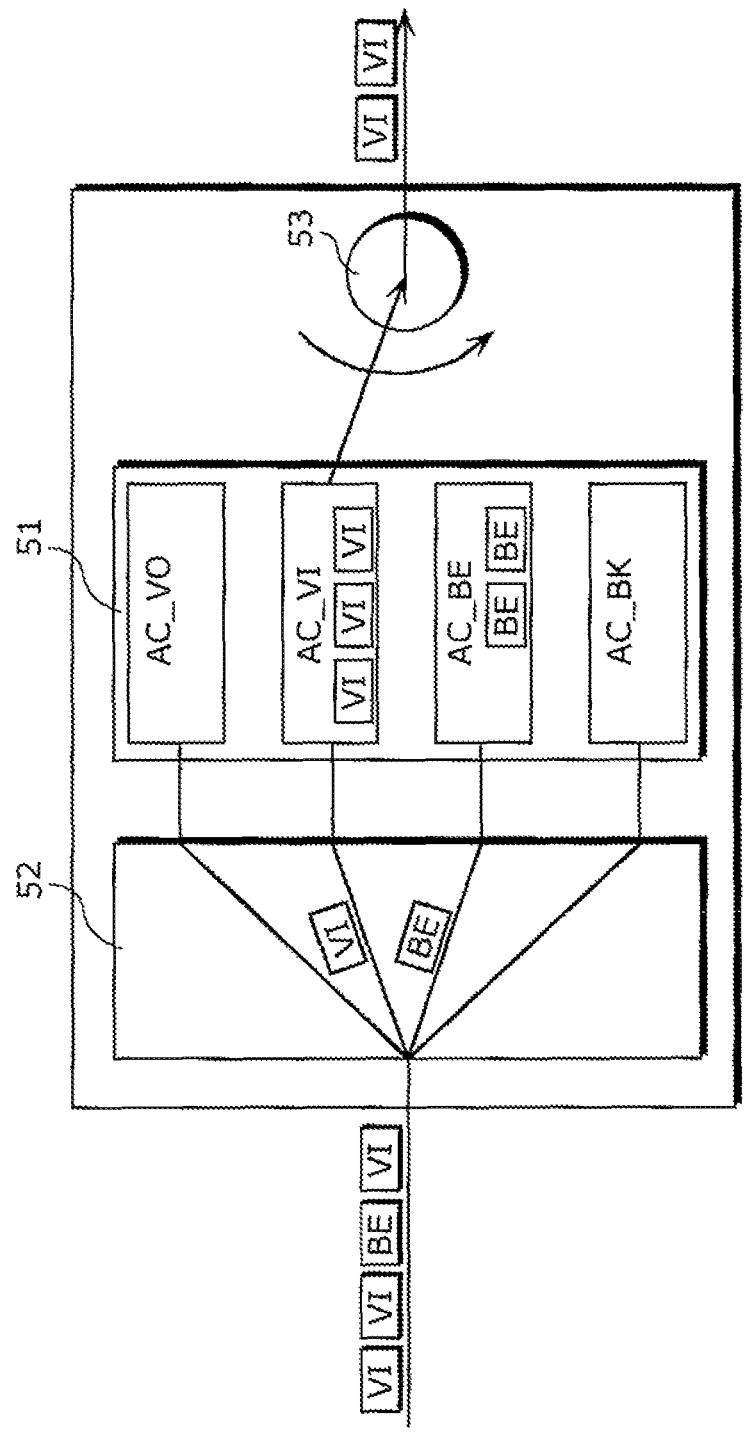
FIG. 5 is a diagram schematically showing priority control processing by a priority control unit 14 shown in FIG. 1.

FIG. 5 is a diagram schematically showing priority control processing by the priority control unit 14 shown in FIG. 1. The priority control unit 14 achieves the priority control processing as shown in FIG. 5.

In the case where the priority control unit 14 receives a data packet from the receiving unit 10, a classifier 52 classifies the packet. ToS or DSCP (Differentiated Services Code Point) indicating priority levels of IP packets or a priority field in a VLAN (Virtual LAN) tag is used for a classification criterion. After classifying packets, the classifier 52 queues the packets in appropriate AC queues.

A scheduler 51 schedules the queued data packets for each of the four degrees of priority, and preferentially transmits data in queues having a high priority level. Four blocks in the scheduler 51 indicate processing units which schedule the data packets for each of the four degrees of priority defined by IEEE 802.11e standard. In other words, the four degrees of priority are as follows: AC_VO (voice); AC_VI (video); AC_BE (best effort); and AC_BK (background). More specifically, the scheduler 51 selects the transmission control parameters held in the transmission control parameter holding unit 13 according to the rate information from the rate measuring unit 12, and switches between these EDCA parameters according to the rate information.

A sending unit 53 preferentially sends, to the transmitting unit 11, the data in the queues having the high priority level according to the scheduling by the scheduler 51.

As described above, the relay device according to Embodiment 1 measures a data transmission rate of the transmitting unit 11, and transmits AC using the EDCA parameters corresponding to the rate information indicating the data transmission rate. With this, even in the case where a communication state of the transmission line becomes worse and collision frequently occurs in a wireless section, it is possible to effectively and preferentially transmit data having a high real-time property.

Embodiment 2

Figure 6:
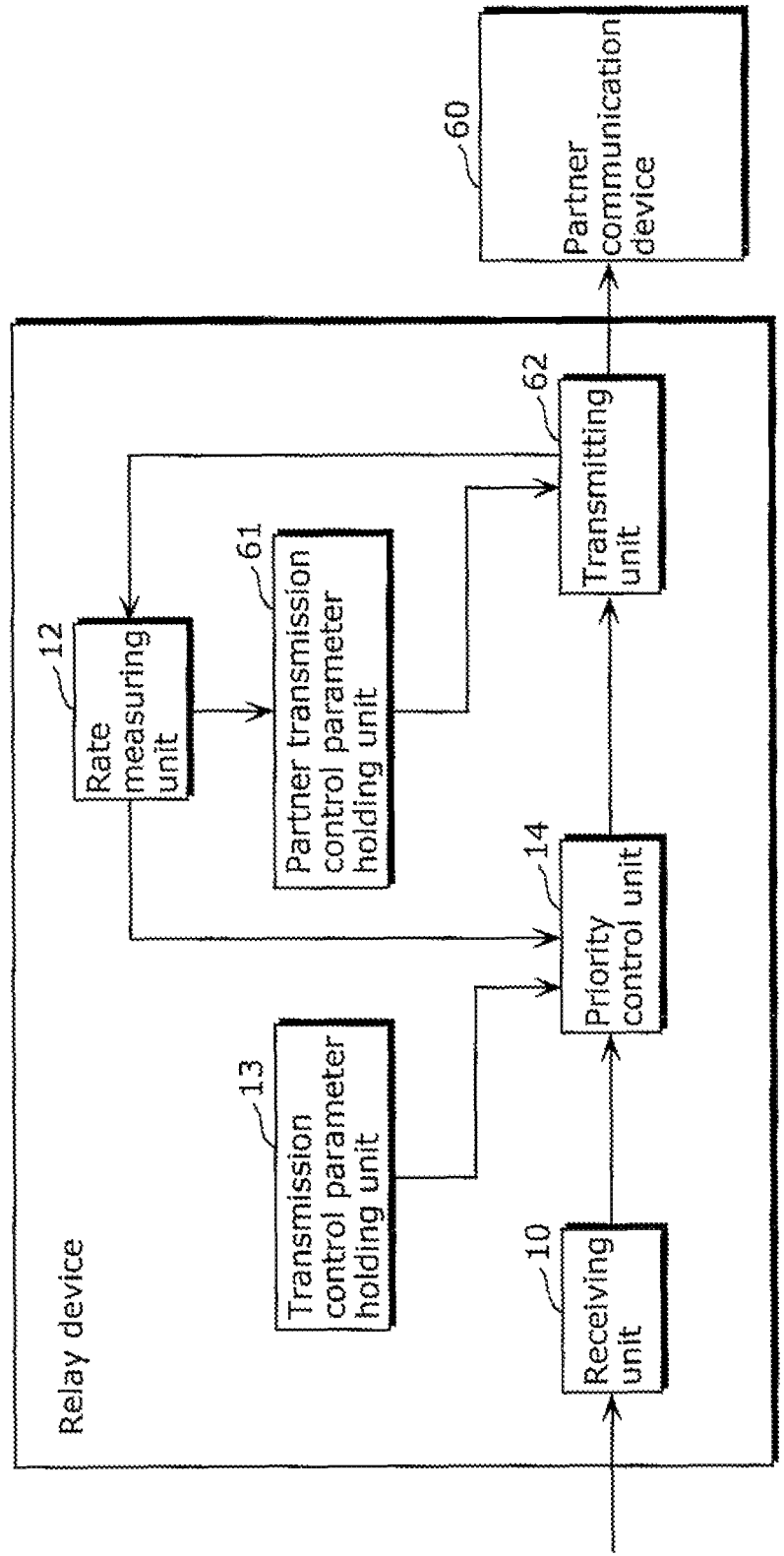
FIG. 6 is a block diagram showing a relay device according to Embodiment 2.

FIG. 6 is a block diagram showing a structure of a relay device according to Embodiment 2. It is to be noted that the same reference signs are assigned to parts corresponding to the components of the relay device according to Embodiment 1, and description thereof is omitted.

A difference from Embodiment 1 is that the relay device according to Embodiment 2 is assumed to perform bidirectional communication with a specific communication device, whereas the relay device according to Embodiment 1 performs the same transmission control on any communication device. The relay device includes: a transmitting unit 62 which operates differently from the transmitting unit 11 according to Embodiment 1; and a partner transmission control parameter holding unit 61. A partner communication device 60 receives data transmitted by the transmitting unit 11, and also transmits own data to the relay device. Here, the rate measuring unit 12 is an example of a rate measuring unit which measures the relative communication rate between the wireless communication device and the partner wireless communication device. The partner transmission control parameter holding unit 61 is an example of a partner transmission control parameter holding unit which holds, in the case where the wireless communication device performs bidirectional communication with a specific partner wireless communication device, partner communication control parameter sets with which the partner wireless communication device performs transmission control, according to a relative communication rate between the wireless communication device and the partner wireless communication device, and holds transmission control parameters corresponding to rate information indicating a relative communication rate between the partner communication device 60 and the transmitting unit 62. Here, the priority control unit 14 is an example of a transmission control unit which selects one of the transmission control parameter sets and one of the partner transmission control parameter sets according to the relative communication rate measured by the rate measuring unit. The transmission control parameter set is defined so that data to which a high priority level is set is preferentially transmitted. The transmitting unit 62 transmits data received by the receiving unit 10 or data to be transmitted, and transmits, to the priority control unit 14, the transmission control parameters read from the partner transmission control parameter holding unit 61. Here, the transmitting unit 62 is an example of a transmitting unit which transmits, to the partner wireless communication device, the partner transmission control parameter set selected by the transmission control unit from among the partner transmission control parameter sets.

FIG. 7 is a diagram showing examples of transmission control EDCA parameters each of which is used by a corresponding one of the relay device and the partner communication device 60 in the case where rate information indicating a relative transmission rate between the relay device and the partner communication device 60 is the maximum value. FIG. 7 (a) shows an example of transmission control parameters used by the relay device in the case where the rate information is the maximum value, and FIG. 7 (b) shows an example of transmission control parameters used by the partner communication device 60 in the case where the rate information is the maximum value. In this case, it is assumed that the transmitting unit 62 transmits a transmission control parameter set of FIG. 7 (b) to the partner communication device 60 and that the priority control unit 14 of the partner communication device 60 performs transmission control on the partner communication device 60 using the received transmission control parameter set. In other words, FIG. 7 (b) shows EDCA parameters which are compliant with the EDCA wireless access control system of IEEE 802.11e standard, are set in the case where rate information is the maximum value, and are set so that a transmission timing indicated by transmission control parameters for relay device held in the transmission control parameter holding unit 13 is not identical with a transmission timing of the partner communication device 60. However, AC_BK has the lowest priority level, and thus a difference in priority is not caused between the relay device and the partner communication device 60. For instance, AC_BK of the relay device and AC_BK of the partner communication device 60 are set to the same values such as AIFS=29 and CWmax=1023 in FIGS. 7 (a) and FIG. 7 (b).

FIG. 8 is a diagram showing examples of transmission control parameters each of which is used by a corresponding one of the relay device and the partner communication device 60 in the case where rate information indicating a relative transmission rate between the relay device and the partner communication device 60 is ½ of the maximum value. FIG. 8

(a) shows an example of transmission control parameters used by the relay device, and FIG. 8 (b) shows an example of transmission control parameters used by the partner communication device 60. As shown in FIG. 8, in the case where the relative transmission rate with the partner communication device 60 is reduced by ½, increasing each of AIFS and CWmax approximately twice of the case shown in FIG. 7 in advance allows completion of transmission of previous data within a pre-assumed data transmission waiting time, and an increase in data transmission efficiency.

FIG. 9 is a diagram showing examples of transmission control parameters each of which is used by a corresponding one of the relay device and the partner communication device 60 in the case where rate information indicating a relative transmission rate between the relay device and the partner communication device 60 is ¼ of the maximum value. FIG. 9 (a) shows transmission control parameters used by the relay device, and FIG. 9 (b) shows an example of transmission control parameters used by the partner communication device 60. As shown in FIG. 9, in the case where the relative transmission rate with the partner communication device 60 is reduced by ¼, increasing each of AIFS and CWmax approximately four times as large as the case shown in FIG. 7 in advance allows completion of transmission of previous data within a pre-assumed data transmission waiting time, and an increase in data transmission efficiency.

Even in the case where the relative transmission rate between the relay device and the partner communication device 60 is changed, the priority control unit 14 of each of the relay device and the partner communication device 60 switches between the transmission control EDCA parameters shown in FIGS. 7 to 9 according to the relative transmission rate between the relay device and the partner communication device 60 and selects transmission control parameters suitable to the changed relative transmission rate, thereby reducing the temporal loss shown in FIG. 4 and efficiently performing the priority-based QoS.

Furthermore, AIFS of the relay device and AIFS of the partner communication device 60 are set in advance so that a time lag is included between AIFSs of both devices. For example, in terms of a value of AIFS of AC_VO of the relay device shown in FIG. 7 (a) and a value of the AIFS of the partner communication device 60 shown in FIG. 7 (b), the value of AIFS of the partner communication device 60 is a value obtained by adding up the value of AIFS of the relay device, a value of CWmax, and 1. Moreover, the value of AIFS of AC_VI shown in FIG. 7 (a) is 5, and is a value obtained by adding up the value of AIFS of AC_VO of the partner communication device 60, a value of CWmax, and 1.

FIG. 10 is a diagram showing that setting of transmission control parameters causes a lag in a transmission waiting time between the relay device and the partner communication device 60, and makes it possible to prevent collision even in the case where the relay device and the partner communication device 60 concurrently make transmission requests. As shown in the diagram, in the case where the relay device and the partner communication device 60 concurrently make the transmission requests at a starting point, AIFS of the partner communication device is always set so that counting of CW of the partner communication device 60 starts after a transmission waiting time of the relay device ends. Thus, in the case where the relay device and the partner communication device 60 concurrently make the transmission requests at the same priority level, the relay device can always start transmission earlier than the partner communication device 60.

Here, the priority control unit 14 is an example of a transmission control unit which performs the selection so that a transmission waiting time for which the transmitting unit of the wireless communication device waits is always different from a transmission waiting time for which a transmitting unit of the partner wireless communication device waits, with respect to concurrent transmission requests from the wireless communication device and the partner wireless communication device.

In addition to the advantageous effect provided by Embodiment 1, such control can provide an advantageous effect of eliminating (i) collision in the case where the relay device and the partner communication device 60 concurrently make the transmission requests in bidirectional communication and (ii) a waiting time caused by the collision.

In other words, according to Embodiment 2, even in the case where the relative transmission rate is changed; the transmission control parameter holding unit 13 and the partner transmission control parameter holding unit 61 respectively hold, for each of the relay device and the partner communication device 60, transmission control parameters which correspond to the relative transmission rates between the relay device and the partner communication device 60, and thus make it possible to generate no unnecessary transmission waiting time and to preferentially transmit data having a high priority level, by switching between the transmission control parameters according to the changed relative transmission rate. On top of that, it is possible to delay, for each of the relay device and the partner communication device 60, a waiting time in the case where the transmission requests are concurrently made, thereby providing the advantageous effect of avoiding the collision even in the case where the transmission requests are concurrently made.

It is to be noted that in Embodiment 2, the partner communication device 60 may also include a rate measuring unit which measures a relative transmission rate between the relay device and the partner communication device 60, and select the most suitable transmission control parameters determined, according to a transmission rate, from among transmission control parameters received in advance from the relay device according to the measured relative transmission rate between the relay device and the partner communication device 60, or the relay device may transmit, to the partner communication device 60, transmission control parameters corresponding to the relative transmission rate between the relay device and the partner communication device 60 which is measured by the rate measuring unit 12, every time the transmission rate is changed. In this case, it is assumed that the partner communication device 60 performs transmission control using the transmission control parameters received from the relay device.

It is to be noted that although Embodiment 2 has been described with reference to FIGS. 7 to 10, Embodiment 2 and FIGS. 7 to 10 are merely an exemplification, and the present invention is not limited to the values shown in FIGS. 7 to 9.

It is to be noted that although the rate information in the above-described present embodiment is the physical rate between the relay device and the partner communication device, this is merely an exemplification. The rate information may be the effective rate between the relay device and the partner communication device. Here, the rate measuring unit 12 is an example of a rate measuring unit which measures an effective rate which is bit traffic per unit time of the main data in the data transmitted by the transmitting unit.

It is to be noted that the relay device and the partner communication device according to the above-described present embodiment may be means to achieve functions and operations thereof, and may be configured by a program and a computer. In addition, a part or all of the relay device and the partner communication device may be configured by hardware.

It is to be noted that all of the above-described embodiments exemplarily show the present invention, and do not limit the present invention in any way. Accordingly, the present invention can be put into practice by other variations, modifications, and a combination of the embodiments, and the scope of the present invention is defined only by the claims.

It is to be noted that each functional block of the block diagram (such as FIG. 1 and FIG. 6) is typically realized as an LSI, an integrated circuit. These blocks may be made as separate individual chips, or as a single chip to include a part or all thereof. For instance, the functional blocks other than a memory may be made as a single chip.

The name used here is the LSI, but it may also be called IC, system LSI, super LSI, or ultra LSI depending on the degree of integration.

Furthermore, the means for circuit integration is not limited to the LSI, and implementation with a dedicated circuit or a generally-purpose processor is also available. It is also acceptable to use an FPGA (Field Programmable Gate Array) that is programmable after the LSI has been manufactured, and a reconfigurable processor in which connections and setting s of circuit cells within the LSI are reconfigurable.

Moreover, if integrated circuit technology that replaces the LSI appears through progress in semiconductor technology or other derived technology, that technology can naturally be used to carry out integration of the functional blocks. Application of biotechnology is one such possibility.

INDUSTRIAL APPLICABILITY

The wireless communication device and the wireless communication control method according to the present invention produce an advantageous effect of enabling smooth communication control based on priority levels of data even in the case where a data transmission rate is significantly changed by a change of a wireless communication environment, and are useful as an access point, which allows terminals to connect to a wireless network, and a client device.

REFERENCE SIGNS LIST

10 Receiving unit
11, 62 Transmitting unit
12 Rate measuring unit
13 Transmission control parameter holding unit
14 Priority control unit
51 Scheduler
52 Classifier
53 Sending unit
60 Partner communication device
61 Partner transmission control parameter holding unit

The invention claimed is:

1. A wireless communication device which transmits received data according to a priority level of the data, said wireless communication device comprising:
a transmission control parameter holding unit configured to hold transmission control parameter sets which correspond to data transmission rates and include transmission parameters indicating that said wireless communication device waits for a shorter transmission waiting time for data to which a higher priority level is set;
a transmitting unit configured to transmit received data;
a rate measuring unit configured to measure a rate at which said transmitting unit transmits the data; and
a transmission control unit configured to select, from among the transmission control parameter sets, a transmission control parameter set including a specific parameter having a value indicating that a transmission waiting time is inversely proportional to the measured transmission rate, and to adaptively control a transmission waiting time for which said transmitting unit waits until start of the transmission of the data, according to the transmission rate of said transmitting unit which is measured by said rate measuring unit and the selected transmission control parameter set,
wherein said transmitting unit is configured to transmit the data according to transmission control by said transmission control unit.

2. The wireless communication device according to claim 1,
wherein said rate measuring unit is configured to measure a physical rate which is bit traffic per unit time of the data transmitted by said transmitting unit.

3. The wireless communication device according to claim 1,
wherein the data transmitted by said transmitting unit includes control data for transmission control and main data used by an application, and
said rate measuring unit is configured to measure an effective rate which is bit traffic per unit time of the main data in the data transmitted by said transmitting unit.

4. The wireless communication device according to claim 3,
wherein said transmission control unit is configured to perform the transmission control using an EDCA (Enhanced Distributed Coordination Access) wireless access control system compliant with the IEEE 802.11e standard, and
the specific parameter is an AIFS (Arbitration Inter Frame Space).

5. The wireless communication device according to claim 4, further comprising
a partner transmission control parameter holding unit configured to hold, in the case where said wireless communication device performs bidirectional communication with a specific partner wireless communication device, partner communication control parameter sets with which the partner wireless communication device performs transmission control, according to a relative communication rate between said wireless communication device and the partner wireless communication device,
wherein said rate measuring unit is configured to measure the relative communication rate between said wireless communication device and the partner wireless communication device,
said transmission control unit is configured to select one of the transmission control parameter sets and one of the partner transmission control parameter sets according to the relative communication rate measured by said rate measuring unit, and
said transmitting unit is configured to transmit, to the partner wireless communication device, the partner transmission control parameter set selected by said transmission control unit from among the partner transmission control parameter sets.

6. The wireless communication device according to claim 5,
wherein said transmission control unit is configured to perform the selection so that a transmission waiting time for which said transmitting unit of said wireless communication device waits is always different from a transmission waiting time for which a transmitting unit of the partner wireless communication device waits, with respect to concurrent transmission requests from said wireless communication device and the partner wireless communication device.

7. A wireless communication device which performs an operation of the partner wireless communication device according to claim 5, said wireless communication device comprising:

a communication unit configured to receive the partner transmission control parameter set from said wireless communication device, and to perform the bidirectional communication with said wireless communication device; and a transmission control unit configured to perform the transmission control on said communication unit according to the partner transmission control parameter set received by said communication unit, wherein said communication unit is configured to perform the bidirectional communication with said wireless communication device according to the transmission control by said transmission control unit.

8. A wireless communication control method performed by a wireless communication device which transmits received data according to a priority level of the data, wherein the wireless communication device includes a transmission control parameter holding unit configured to hold transmission control parameter sets which correspond to transmission rates and include transmission parameters indicating that the wireless communication device waits for a shorter transmission waiting time for data to which a higher priority level is set, said wireless communication method comprises:

transmitting received data, said transmitting being performed by a transmitting unit;

measuring a transmission rate at which the data is transmitted in said transmitting, said measuring being performed by a rate measuring unit;

selecting, from among the transmission control parameter sets, a transmission control parameter set including a specific parameter having a value indicating that a transmission waiting time is inversely proportional to the measured transmission rate, said selecting being performed by the transmitting unit; and adaptively-controlling a transmission waiting time for which the transmitting unit waits until start of the transmission of the data in said transmitting, according to the transmission rate in said transmitting which is measured in said measuring and the selected transmission control parameter set, said adaptively-controlling being performed by a transmission control unit, wherein the transmitting unit transmits the data according to transmission control in said adaptively-controlling.

9. A non-transitory computer-readable recording medium for use in a computer and having a computer program recorded thereon, the computer program being used by a wireless communication device which transmits received data according to a priority level of the data and causing the computer to function as:

the transmitting unit, the rate measuring unit, and the transmission control unit included in the wireless communication device according to claim 1.

10. An integrated circuit which operates as a wireless communication device which transmits received data according to a priority level of the data, said integrated circuit comprising the transmitting unit, the rate measuring unit, and the transmission control unit included in the wireless communication device according to claim 1.

* * * * *